(12) United States Patent
Mashiko et al.

(10) Patent No.: US 7,980,070 B2
(45) Date of Patent: Jul. 19, 2011

(54) EXHAUST GAS COOLING SYSTEM FOR ENGINE

(75) Inventors: Tetsuya Mashiko, Shizuoka-ken (JP); Tetsuya Ishino, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 902 days.

(21) Appl. No.: 11/946,699

(22) Filed: Nov. 28, 2007

(65) Prior Publication Data

US 2008/0141666 A1     Jun. 19, 2008

(30) Foreign Application Priority Data

Nov. 28, 2006  (JP) ................................. 2006-319803
May 18, 2007  (JP) ................................. 2007-132765

(51) Int. Cl.
*F01N 3/00* (2006.01)

(52) U.S. Cl. ............................... 60/298; 60/322; 60/324

(58) Field of Classification Search .................... 60/274, 60/297, 298, 311, 322, 324
See application file for complete search history.

(56) References Cited

U.S. PATENT DOCUMENTS

| 4,997,399 | A  | * | 3/1991  | Nakayasu et al. | ........... 440/89 F |
| 5,212,949 | A  | * | 5/1993  | Shiozawa | ........................ 60/298 |
| 5,366,401 | A  | * | 11/1994 | Nanami et al. | ............... 440/89 R |
| 6,213,827 | B1 | * | 4/2001  | Hattori et al. | ................ 440/89 R |
| 6,461,208 | B2 | * | 10/2002 | Suzuki et al. | ................ 440/89 R |
| 6,688,929 | B2 | * | 2/2004  | Lecours et al. | ............. 440/89 R |

FOREIGN PATENT DOCUMENTS

JP          08-053098          2/1996

* cited by examiner

*Primary Examiner* — Thomas E Denion
*Assistant Examiner* — Diem Tran
(74) *Attorney, Agent, or Firm* — Keating & Bennett, LLP

(57) ABSTRACT

An exhaust gas cooling system for an engine includes an exhaust gas conduit having an inner tube defining an exhaust gas passage and an exhaust coupler surrounding the inner tube and defining a cooling water passage together with the inner tube therebetween, and a water-lock coupled with a downstream end of the exhaust gas conduit through an exhaust gas conduit coupling section which extends from an upstream end of the water-lock. The exhaust gas conduit coupling section and the exhaust coupler are coupled with each other and the inner tube extends into the interior of the water-lock. A downstream end part of the inner tube can be formed to be a wide portion having a bell mouth configuration. A diameter of the downstream end part becomes larger as a portion thereof exists closer to the end of the downstream end part. The exhaust gas cooling system for the engine can be provided for a water vehicle.

18 Claims, 4 Drawing Sheets

EXHAUST GAS COOLING SYSTEM FOR ENGINE

PRIORITY INFORMATION

The present application is based on and claims priority under 35 U.S.C. §119(a-d) to Japanese Patent Application No. 2006-319803, filed on Nov. 28, 2006 and Japanese Patent Application No. 2007-132765, filed on May. 18, 2007, the entire contents of which is expressly incorporated by reference herein.

BACKGROUND OF THE INVENTIONS

1. Field of the Inventions

The present inventions relate to exhaust gas cooling systems, for example, liquid-cooled exhaust systems that allow the cooling liquid and exhaust gases to mix with each other.

2. Description of the Related Art

Some known exhaust gas cooling systems include an exhaust gas conduit having an exhaust gas passage through which exhaust gases discharged from an engine pass and a cooling water passage through which cooling water passes. Some of these systems are also designed to mix the cooling water and exhaust gases before they are discharged to the atmosphere. Some water vehicles, such as small planing boats, include such exhaust gas cooling systems. For example, Japanese Patent Document JP-A-Hei 8-53098 discloses a water vehicle having such an exhaust system and a propulsion system that draws water through a bottom opening and spouts the water rearwardly from a rear end thereof to generate the propulsion power propel the water vehicle on the water.

Some designs for exhaust gas cooling systems for water vehicles include an exhaust gas conduit (exhaust manifold) extending from an engine to a water-lock (muffler). The exhaust gas conduit is formed with a dual pipe, i.e., an inner tube disposed inside and an outer tube disposed outside.

The inner tube defines an exhaust gas passage through which exhaust gases pass. The inner tube and the outer tube together define a cooling water passage therebetween through which cooling water passes. The outer tube extends to the vicinity of the water-lock to be connected to the water-lock via a rubber tube. The inner tube extends into the interior of the water-lock. Thus, the exhaust gases flow through the inner tube into the water-lock, while the cooling water flows between the outer tube and the inner tube and also between the rubber tube and the inner tube and then is released into the water-lock. The exhaust gases and the cooling water are then mixed within the water-lock.

Because the exhaust gases and the cooling water are mixed within the water-lock, the cooling water can flow back into the engine through the inner tube of the exhaust gas conduit due to the effect of exhaust gas pulsations caused by the engine. Thus, in order to reduce such an effect from the exhaust gas pulsations, some designs include an extended exhaust gas conduit. For example, in some designs, the exhaust gas conduit extends from a side of the engine, to a front end of the engine, to the other side of the engine, then rearwardly along the other side of the engine toward the water-lock.

SUMMARY OF THE INVENTIONS

An aspect of at least one of the embodiments disclosed herein includes the realization that other techniques can be used to reduce the effect of exhaust gas pulsations sufficiently to avoid the need for such an extended exhaust gas conduit. As such, small watercrafts, such as personal watercrafts with relatively narrow engine compartments, can benefit from the removal of the wrap-around type exhaust system described above.

Thus, in accordance with an embodiment, an exhaust gas cooling system for an engine can comprise an exhaust gas conduit having an inner tube defining an exhaust gas passage through which exhaust gases discharged from the engine pass, and an outer tube surrounding the inner tube and thereby defining a cooling water passage between the inner tube and outer tube, the cooling water passage being configured to pass cooling water that has cooled the engine. A water-lock can be configured to prevent a backward flow of water, an exhaust gas conduit coupling section being formed at an upstream end portion thereof, the water-lock being coupled with a downstream end of the exhaust gas conduit through the exhaust gas conduit coupling section. Additionally, the exhaust gas conduit coupling section of the water-lock and the outer tube of the exhaust gas conduit can be coupled with each other, the inner tube extending into an interior of the water-lock to form a cooling water releasing port between the exhaust gas conduit coupling section and the inner tube, the cooling water releasing port being configured to release the cooling water flowing through the cooling water passage such that the cooling water released from the cooling water releasing port and the exhaust gases discharged from the exhaust gas passage are mixed together within the water-lock. A downstream end part of the inner tube can be formed such that the diameter of the inner tube becomes larger toward the downstream end so that the cooling water released into the water-lock diffuses.

In accordance with another embodiment, an exhaust gas cooling system for an engine can comprise an exhaust gas conduit having a cooling jacket disposed on an outer surface of the exhaust gas conduit and a water-lock. The exhaust gas conduit can terminate at a downstream end within an interior of the water-lock, the cooling jacket terminating at a cooling water discharge disposed upstream of the downstream end of the exhaust gas conduit and configured to discharge water into the interior of the water-lock. Additionally, the downstream end of the exhaust gas conduit is enlarged so as to cause cooling water from the cooling water discharge to diffuse radially away from the downstream end of the exhaust gas conduit.

In accordance with a further another embodiment, an exhaust gas cooling system for an engine can comprise an exhaust gas conduit having an inner tube defining an exhaust gas passage through which exhaust gases discharged from the engine pass, and an outer tube surrounding the inner tube and thereby defining a cooling water passage between the inner tube and outer tube and a water-trap chamber. The inner tube can extend into and terminate at a downstream end in an interior of the water-trap chamber. The cooling water passage can terminate upstream from the downstream end of the inner tube so as to allow cooling water from the cooling water passage to be discharged into the water-trap chamber parallel to an outer surface of the inner tube. Additionally, means can be provided for causing the cooling water to disperse radially off of the outer surface of the downstream end of the inner tube and for causing exhaust gases to disperse radially outwardly from the exhaust gas passage at the downstream end of the inner tube.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION OF THE PREFERRED EMBODIMENT

Figure 1:
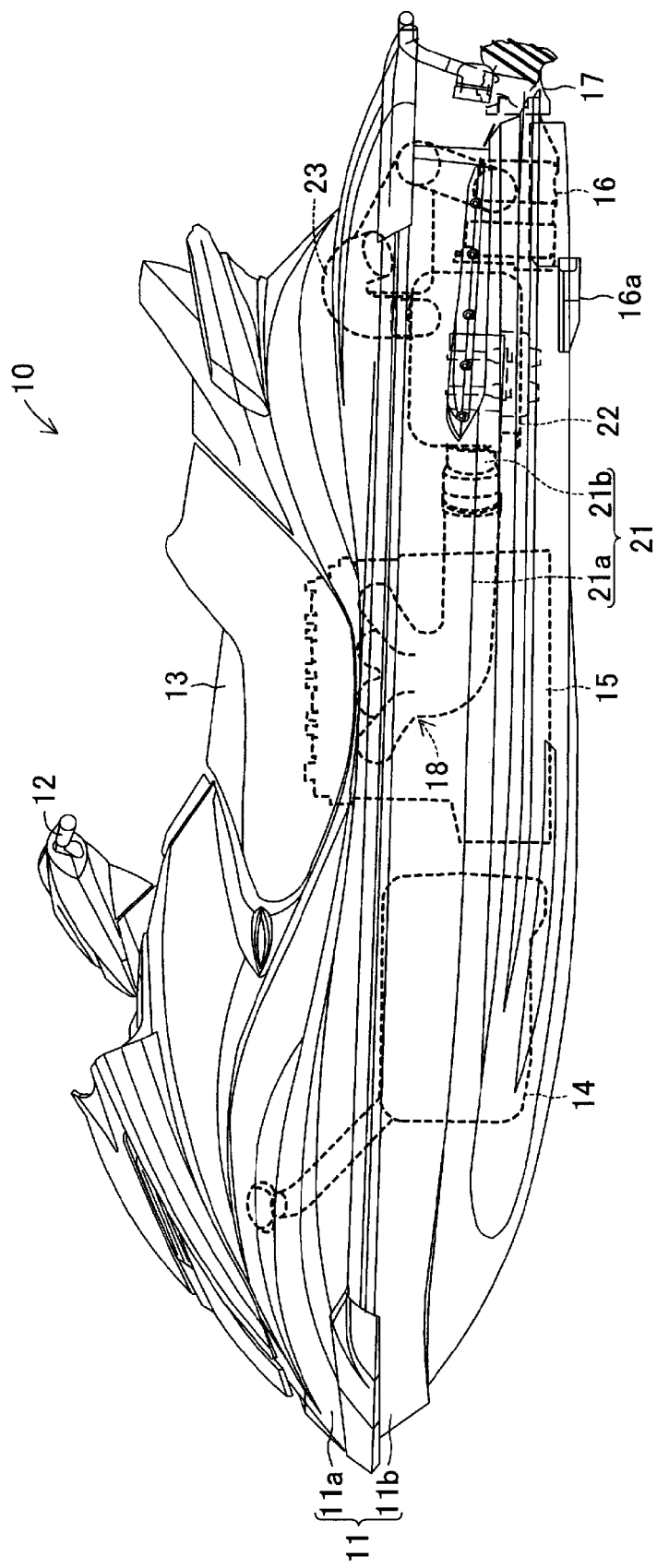
FIG. 1 is a side elevational view of a water vehicle having an exhaust gas cooling system in accordance with an embodiment.

FIG. 1 illustrates a small water vehicle 10 having an exhaust system in accordance with several embodiments. The exhaust system is disclosed in the context of a small water vehicle because it has particular utility in this context. However, the exhaust system can be used in other contexts, such as, for example, but without limitation, outboard motors, inboard/outboard motors, and for engines of other vehicles including land vehicles.

With reference to FIG. 1, a water vehicle 10 can include a vehicle body 11 having a deck 11a and a hull 11b. A steering handle unit 12 can be disposed at a forward portion located slightly more forward than a center portion of an upper section of the vehicle body 11. A seat 13 can be disposed at the center portion of the upper section of the vehicle body 11. A fuel tank 14 for containing fuel can be disposed at a front portion of a bottom section located inside the vehicle body 11. An engine 15 can be disposed at a center portion of the bottom section inside the vehicle body 11.

A propulsion unit 16 can be disposed at a rear end section of the vehicle body 11. The propulsion unit 16 can be coupled with the engine 15 through an impeller shaft (not shown). A steering nozzle 17 can be attached to a rear end portion of the propulsion unit 16. A rear portion of the steering nozzle 17 can swing rightward and leftward in response to an operation of the steering handle unit 12 to change advancing directions of the water vehicle 10 rightward and leftward.

An intake system (not shown) and an exhaust system 18 can be connected to the engine 15. The intake system can be configured to guide mixtures of fuel supplied from the fuel tank 14 and air into the engine 15. The exhaust system 18 can be configured to guide exhaust gases discharged from the engine 15 to an external location from the rear end portion of the vehicle body 11, or other locations.

The engine 15 can have intake valves and exhaust valves associated with each of the respective cylinders of the engine 15. The engine 15 can draw in the air/fuel mixtures in from the intake system, positioned upstream the intake valves, in accordance with opening and closing operations of the intake valves. The engine 15 can also discharge exhaust gases to the exhaust system 18, positioned downstream of the exhaust valves, in accordance with opening and closing operations of the exhaust valves.

An ignition device of the engine 15 can be used to ignite the mixtures supplied to the inside of the engine 15 through the intake valves. The burning of the mixtures causes pistons (not shown) disposed inside the engine 15 to reciprocate. The reciprocating movement of the pistons rotates a crankshaft.

The crankshaft can be coupled with an impeller shaft and thus can transmit the rotational force to the impeller shaft to rotate the impeller shaft. An impeller disposed within the propulsion unit 16 can be joined to a rear end portion of the impeller shaft. The rotation of the impeller can generate a propulsion force for the water vehicle 10.

For example, the propulsion unit 16 can have a water introducing opening 16a which opens in the bottom of the vehicle body 11 and a water jetting opening (not shown) which opens in the rear end of the vehicle body 11. The rotation of the impeller can introduce water such as, for example, seawater into the propulsion unit 16 through the water introducing opening 16a and jet the water outside through the water jetting opening to generate the propulsion force for the vehicle body 11.

Although not shown, the intake system can have intake conduits connected to the engine 15, throttle bodies connected to the respective intake conduits and so forth. The intake system can thus introduce the air outside the vehicle through intake ducts and an intake box. The intake system can also be configured to adjust or "meter" an amount of the air through movement of a throttle valve disposed in each throttle body between an open position and a closed position to supply a desired amount of the air to the engine 15. The intake system can also be configured to mix the fuel supplied from the fuel tank 14 through a fuel supply device with the air that is going to be supplied to the engine 15. However, other types of systems can also be used, such as, for example but without limitation, direct injection fuel systems, throttle-less intake systems, as well as other systems.

Figure 2:
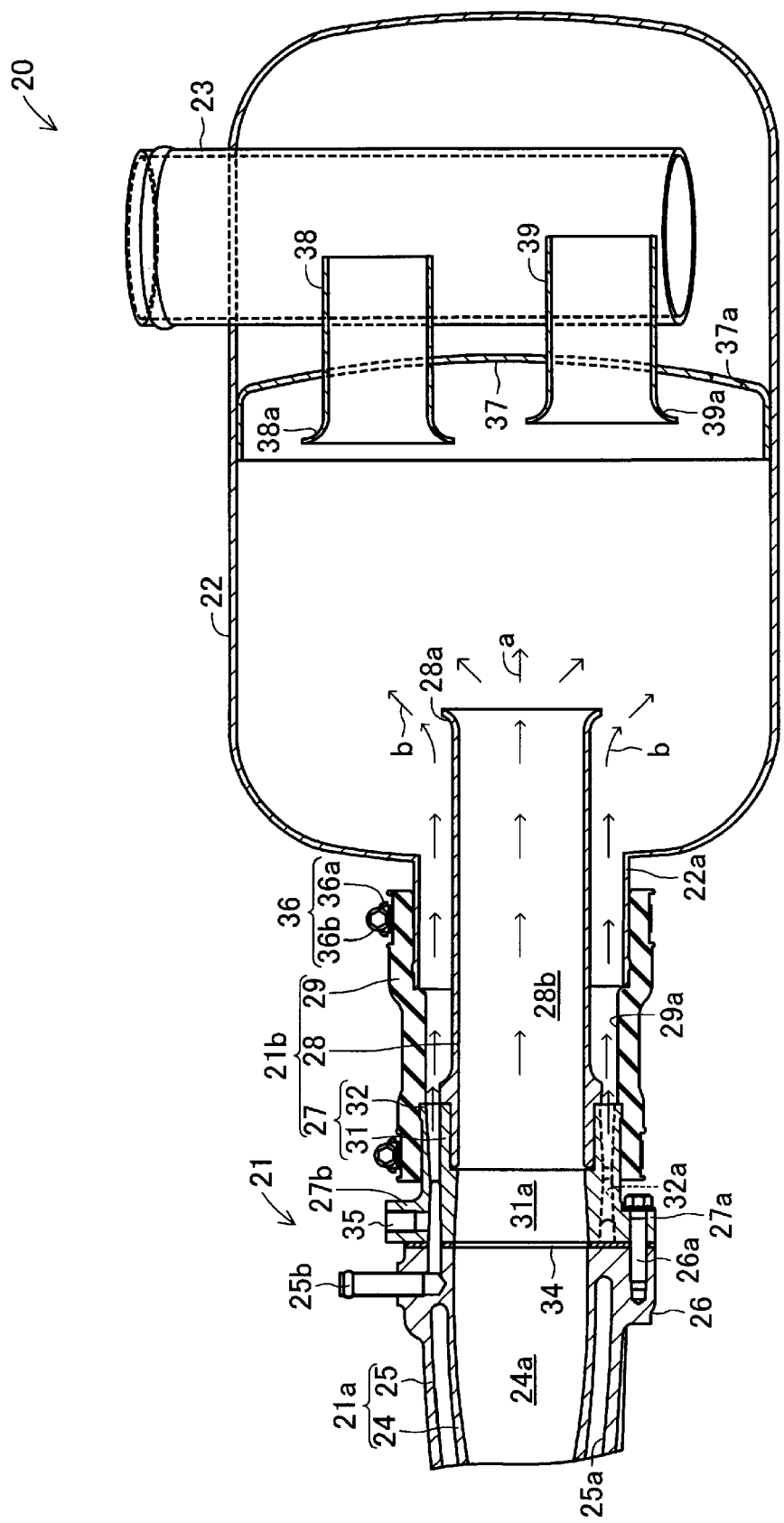
FIG. 2 is a side elevational and cross sectional view of a portion of the exhaust gas cooling system of FIG. 1.
Figure 3:
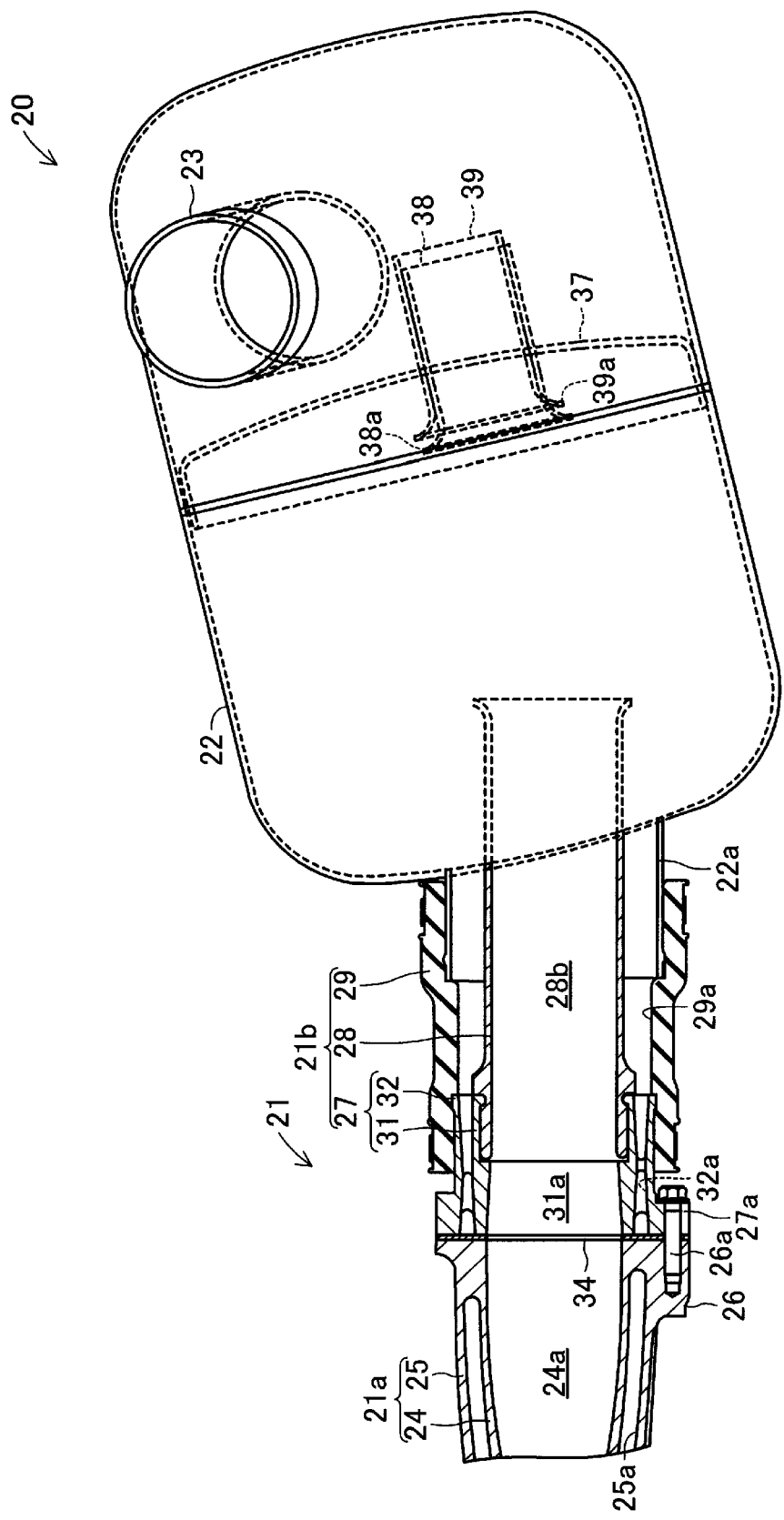
FIG. 3 is a top plan and partial cross sectional view of the portion of the exhaust gas cooling system of FIG. 1.

The exhaust system 18 can have an exhaust gas cooling system 20, shown in FIGS. 2 and 3. The cooling system can include an exhaust gas conduit 21 connected to a lateral side of the engine 15, a tank-like water-lock 22 coupled with a rear end of the exhaust gas conduit 21, an exhaust gas pipe 23 coupled with a rear portion of the water-lock, etc. However, other configurations can also be used.

Upstream portions of the exhaust gas conduit 21 can extend toward a lateral side of the engine 15, i.e., from downstream ends of internal passages extending from the exhaust valves of the respective cylinders, and can merge together to form a single conduit which extends rearwardly. However, other configurations can also be used.

The rear end of the exhaust gas conduit 21 can communicate with a front portion of the water-lock 22. The exhaust gas pipe 23 can extend from a rear top surface of the water-lock 22 and can further extend rearwardly. That is, the exhaust gas pipe 23 can first extend upwardly from the rear top surface of the water-lock 22 and then downwardly and rearwardly. A downstream end of the exhaust gas pipe 23 can open at a lower rear end of the vehicle body 11. However, other configurations can also be used.

The exhaust gas conduit 21 can include an upstream conduit section 21a disposed next to the engine 15 and a connecting conduit section 21b connecting the upstream conduit section 21a and the water-lock 22 to each other. The upstream conduit section 21a can be formed with a dual pipe made of aluminum and having an inner tube 24 and an outer tube 25. However, other configurations can also be used.

The inner tube 24 can define an exhaust gas passage 24a through which exhaust gases discharged from the engine 15 can pass. An outer surface of the inner tube 24 and an inner surface of the outer tube 25 together can define a cooling water passage 25a therebetween through which cooling water can pass. In some embodiments, cooling water can first be used to cool the engine and then directed into the cooing water passage 25a. However, other configurations can also be used.

For example, the cooling water passing through the cooling water passage 25a can be, for example, seawater introduced through the rear portion of the bottom section of the vehicle body 11. The cooling water passes through respective cooling water passages (not shown) disposed within the vehicle body 11 and then moves to respective portions including the engine 15.

A downstream end part of the upstream conduit section 21a can have a cylindrical connector 25b disposed at a portion of a circumferential surface of the downstream end part. The cylindrical connector 25b and a portion of a component of the vehicle such as the engine 15 can be connected to each other through a cooling water hose (not shown). Thus, the cooling water that has been sent to the respective portions including the engine 15 from the cooling water passage 25a and has cooled the engine 15, etc. returns to the upstream conduit section 21a through the cooling water hose and the cylindrical connector 25b.

A downstream end of the upstream conduit section 21a can have a plurality of bolt receiving portions 26 at which bolt holes are formed circumferentially at specific intervals. Bolts 26a for coupling the upstream conduit section 21a and the connecting conduit section 21b with each other can be inserted into the respective bolt holes of the bolt receiving portions 26 from the downstream side of the bolt receiving portions 26 to the upstream side thereof.

The downstream end of the upstream conduit section 21a can have apertures circumferentially spaced apart from each other and extending from the upstream side to the downstream side. Because the apertures communicate with the cylindrical connector 25b, the cooling water returning through the cylindrical connector 25b flows to the connecting conduit section 21b through the apertures.

The connecting conduit section 21b can be formed with a tail pipe 27 coupled with the downstream end of the upstream conduit section 21a, an inner tube 28 extending from a downstream side inner surface of the tail pipe 27 to the interior of the water-lock 28, and an exhaust coupler 29 extending from a downstream side outer surface of the tail pipe 27 toward the water-lock 22. The tail pipe 27 can be formed with a dual pipe having an inner tube 31 and an outer tube 32, a length of the dual pipe being short in its axial direction. The inner tube 31 can define an exhaust gas passage 31a communicating with the exhaust gas passage 24a. An outer surface of the inner tube 31 and an inner surface of the outer tube 32 together can define a cooling water passage 32a communicating with the cooling water passage 25a through the cooling water hose and the cylindrical connector 25b. However, other configurations can also be used.

An upstream end of the tail pipe 27 can have a plurality of bolt receiving portions 27a at which bolt holes can be formed circumferentially at regular intervals. The bolts 26a can be inserted into the respective bolt holes of the bolt receiving portions 27a and the bolt receiving portions 26 of the upstream conduit section 21a from the downstream side of the bolt receiving portions 27a to the upstream side of the bolt receiving portions 26. Thus, the upstream conduit section 21a and the tail pipe 27 can be coupled with each other by the bolts 26a being screwed into the bolt holes of the respective bolt receiving portions 26, 27a.

A sealing gasket 34 can be placed between respective contact surfaces of the upstream conduit section 21a and the tail pipe 27. The gasket 34 can have apertures allowing the bolts 26a to pass therethrough, apertures through which the exhaust gas passages 24a, 31a communicate with each other, and apertures through which the cylindrical connector 25b and the cooling water passage 32a communicate with each other. However, other configurations can also be used. Because of these apertures, the exhaust gases and the cooling water can flow from the upstream conduit section 21a to the tail pipe 27, and the upstream conduit section 21a and the tail pipe 27 can be coupled with each other by the bolts 26a.

A projection 27b can extend from the upstream end portion of the tail pipe 27. A through-hole can pierce the projection 27b between an inner surface and an outer surface of the outer tube 32. In some embodiments, a temperature sensor 35 can be inserted into the through-hole of the projection 27b to detect a temperature of the cooling water passing through the cooling water passage 32a.

The inner tube 28 can be formed with a cylindrical pipe made of aluminum, or any other appropriate material. A distal end portion (downstream end part) of the inner tube 28 can have a wide portion 28a which can be shaped as a smooth bell mouth configuration. In some embodiments, an outer diameter of the wide portion 28a can gradually become larger toward the end of the distal end.

The inner tube 28 can be fastened to the tail pipe 27 in such a manner that an upstream end part of the inner tube 28 can be screwed into the inner surface of the downstream end portion of the tail pipe 27. The downstream end of the inner tube 28, on the other hand, can extend into the interior of the water-lock 22. The inner tube 28 thus can define an exhaust gas passage 28b communicating with the exhaust gas passages 24a, 31a.

The exhaust coupler 29 can be made of a flexible cylindrical rubber, or any other appropriate material. A downstream portion of the tail pipe 27 can be inserted into an upstream end portion of the exhaust coupler 29 so that the tail pipe 27 and the exhaust coupler 29 are joined together.

An upstream end portion of the water-lock 22 can have a cylindrical exhaust gas conduit coupling section 22a. A downstream end portion of the exhaust coupler 29 can extend to the water-lock 22 to cover an outer surface of the exhaust gas conduit coupling section 22a. In some embodiments, a space can be defined between the exhaust hose 29 and the inner tube 28. The space can be configured to function as a cooling water passage 29a communicating with the cooling water passage 32a.

The upstream portion of the exhaust coupler 29 and the tail pipe 27 can be fixed to each other by respective facing portions thereof being fastened using a fastening unit 36. On the other hand, the downstream portion of the exhaust coupler 29 and the exhaust gas conduit coupling section 22a can be fixed to each other by respective facing portions thereof being fastened using another fastening unit 36.

In some embodiments, each fastening unit 36 can be formed with a steel band 36a and a screw 36b. Each steel band 36a can surround the exhaust coupler 29 under a condition that the respective facing portions of the exhaust coupler 29 and the tail pipe 27, or the respective facing portions of the exhaust coupler 29 and the exhaust gas conduit coupling section 22a are sealed in a water-tight or substantially water-tight manner. Each screw 36b tightens both ends of the respective steel band 36a. However, other configurations can also be used.

Accordingly, when the respective screws 36b are turned, the respective steel bands 36a are circumferentially tightened. Thereby, the respective facing portions of the exhaust coupler 29 and the tail pipe 27, and the respective facing portions of the exhaust coupler 29 and exhaust gas conduit coupling section 22a are fixed to each other under a sealed or substantially sealed condition. Additionally, the inner tubes 31,28 can be considered as forming an "inner tube". Similarly, and the outer tube 32 and the exhaust coupler 29 can be considered as forming an "outer tube". The cooling water passage 29a can communicate with a space defined between an outer surface of the inner tube 28 and an inner surface of the exhaust gas conduit coupling section 22a. A downstream end of the space can be considered as forming a "cooling water releasing port". However, other configurations can also be used.

The water-lock 22 can be formed to have the tank-like configuration in such a manner that openings of two vessels are mated and welded together. However, other configurations can also be used. The exhaust gas conduit coupling section 22a can extend forward from an upstream end of the tank-like configuration.

As shown in FIG. 3, the exhaust gas conduit coupling section 22a can slant relative to the water-lock 22 in such a manner that respective axes of the exhaust gas conduit coupling section 22a and the body of the water-lock 22 are skewed relative to each other and together define an angle in a horizontal direction.

The exhaust gas conduit coupling section 22a and the connecting conduit section 21b can extend coaxially. A partition 37 can divide the interior of the water-lock 22 into an upstream part and a downstream part. The partition 37 can be a curved plate member whose one surface is recessed centrally. In other words, the other surface of the partition 37 can swell out centrally. The partition 37 can be positioned slightly rearward (downward) relative to the center of the water-lock 22 with the recessed surface being directed upstream.

A pair of partition pipes 38, 39 can extend through the partition 37. The respective partition pipes 38, 39 can be spaced apart from each other in a vertical direction to be positioned in an area of the partition 37 generally corresponding to the expanding angle of the wide portion 28a of the inner tube 28. Each partition pipe 38, 39 can be cylindrically shaped.

An upstream end of each partition pipe 38, 39 can have a wide portion 38a, 39a which can be shaped as a bell mouth similarly to the wide portion 28a of the inner tube 28. A lower portion of the partition 37 can have a drain port 37a through which the cooling water accumulating in the upstream part of the water-lock 22 flows away to the downstream part. An upstream end portion of the exhaust gas pipe 23 can pierce a top wall of the water-lock 22 in the downstream part thereof to enter the interior of the water-lock 22. A bottom end of the exhaust gas pipe 23 can extend downwardly to a location adjacent to the bottom of the water-lock 22.

Figure 4:
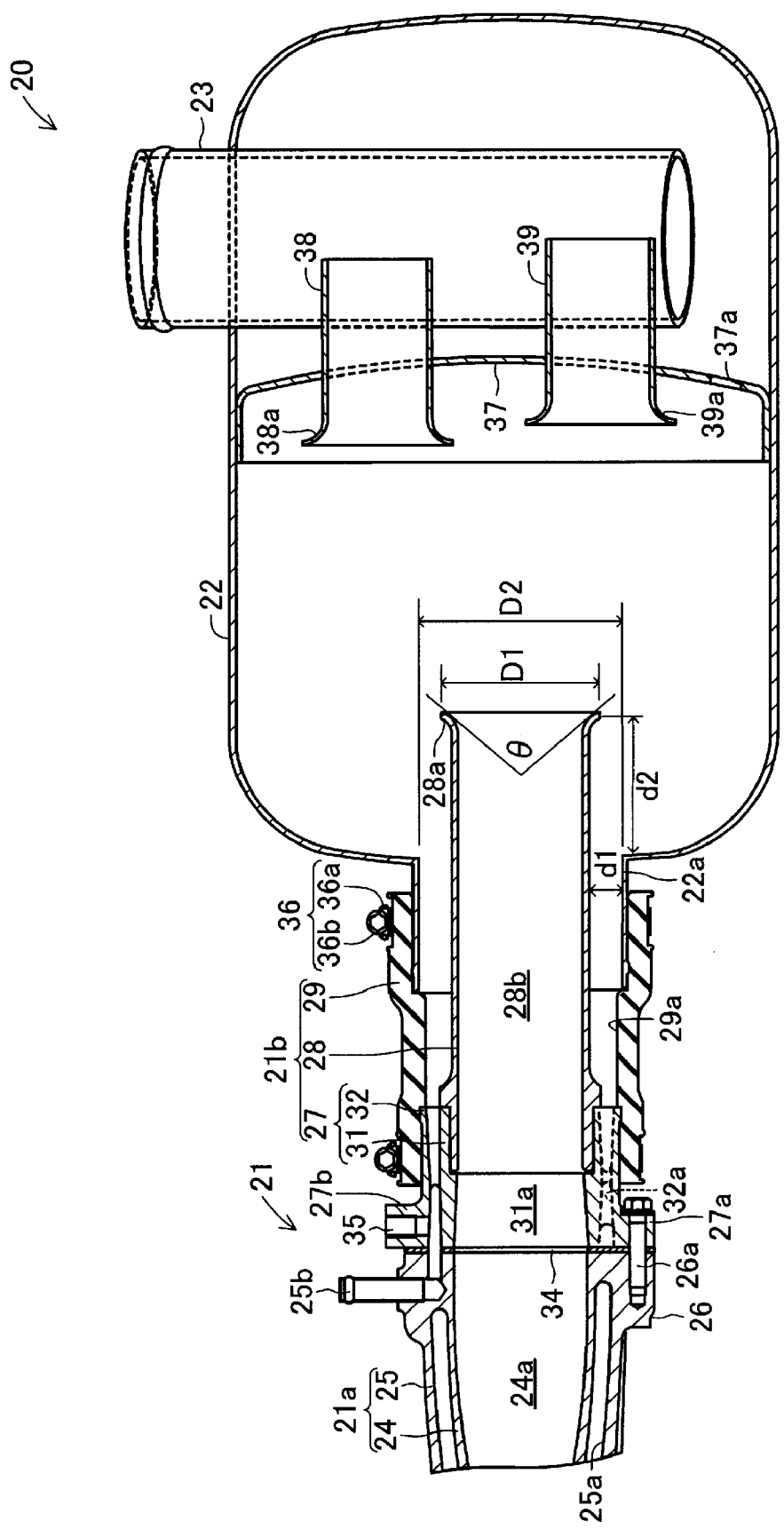
FIG. 4 is a side elevational and cross sectional view of the exhaust gas cooling system, showing exemplary dimensional relationships between a connecting conduit section and the water-lock.

In some embodiments, the connecting conduit section 21b and the water-lock 22 as disclosed above can be coupled with each other with the dimensional relationships shown in FIG. 4. That is, if a distance between the outer surface of the inner tube 28 and the inner surface of the exhaust gas conduit coupling section 22a is d1 and a distance between the downstream end of the exhaust gas conduit coupling section 22a and the distal end of the wide portion 28a of the inner tube 28 is d2, the inner tube 28 and/or the water-lock 22 can be sized such that the distance d2 is longer than the distance d1.

Additionally, in some embodiments, if a diameter of the distal end of the wide portion 28a is D1 and an inner diameter of the exhaust gas conduit coupling section 22a is D2, the inner tube 28, the water-lock 22, and/or other components can be sized such that the diameter D1 is shorter than the inner diameter D2. If the distal end of the inner surface of the wide portion 28a expands with an angle θ tangentially, the partition pipes 38, 39 are positioned in the inside area of this angle θ.

Because of this arrangement, the cooling water released into the upstream part of the water-lock 22 from the cooling water releasing port defined between the outer surface of the inner tube 28 and the inner surface of the exhaust gas conduit coupling section 22a can better diffuse. The cooling water thus can be prevented from flowing back into the inner tube 28 even though exhaust pulsations are caused by the engine 15. Also, the cooling water can effectively enter the downstream part of the water-lock 22 together with the exhaust gases released into the upstream part of the water-lock 22 from the inner tube 28.

During operation, when a rider of the water vehicle 10 turns a start switch (not shown) on, the water vehicle 10 is ready to start running. The rider straddling the seat 13 can steer the steering handle bar 12 and operate a throttle lever (not shown). Thus, the water vehicle 10 starts to run in a direction according to the movement of the steering handle bar 12 and in a speed according to the position of the throttle lever. While the water vehicle 10 runs, the exhaust gases discharged from the engine 15 flows into the upstream part of the water-lock 22 passing through the exhaust gas passages 24a, 31a, 28b of the exhaust gas conduit 21.

The cooling water, which may come directly from the body of water in which the water vehicle is operating or may have already been used to cool the engine 15 or other devices, flows into the upstream part of the water-lock 22 through the cooling water hose, the cylindrical connector 25b and the cooling water passages 32a, 29a. Thus, as indicated by the arrows "a" of FIG. 2, the exhaust gases spout from the wide portion 28a of the inner tube 28 to slightly expand. Also, as indicated by the arrows "b" of FIG. 2, the cooling water also expands to diffuse along the wide portion 28a of the inner tube 28. Therefore, the cooling water cools a wide area of the wall surface of the water-lock 22 and also the exhaust gases without backwardly flowing to the inside of the inner tube 28 even though the exhaust pulsations are caused by the engine 15.

The exhaust gases and the cooling water in the mixed state pass through the partition pipes 38, 39 to enter the downstream part of the water-lock 22 and then are released to an external location of the vehicle through the exhaust gas pipe 23. Because the upstream end of each partition pipe 38, 39 has the wide portions 38a, 39a, the exhaust gases and the cooling water smoothly enter the partition pipes 38, 39. The exhaust gases and the cooling water thus can effectively pass through the partition pipes 38, 39.

If some of the cooling water accumulates in the upstream part of the water-lock 22, the cooling water flows toward the downstream part of the water-lock 22 through the drain port 37a defined in the lower portion of the partition 37. The cooling water in the water-lock 22 can be released outside together with the flow of the exhaust gases. The exhaust gas pipe 23 and the water-lock 22 in this water vehicle 10 further prevent the seawater outside the vehicle from entering and backwardly flowing toward the exhaust gas conduit 21.

As noted above, in some embodiments of the exhaust gas cooling system 20, the exhaust coupler 29 forming the outer tube of the connecting conduit section 21b of the exhaust gas conduit 21 can be connected to the exhaust gas conduit coupling section 22a and the inner tube 28 can extend into the interior of the water-lock 22. Also, the downstream end part of the inner tube 28 can be formed as the wide portion 28a such that the diameter of the inner tube becomes larger toward the downstream end. Thus, the exhaust gases spout into the water-lock 22 from the inner tube 28 in the manner such that the exhaust gases slightly expand their courses to move, and the cooling water spouts into the water-lock 22 along the outer surface of the inner tube 28 from the cooling water releasing port.

The cooling water can diffuse in a wide area because of the wide portion 28a of the inner tube 28. The cooling water thus can be prevented from backwardly flowing toward the engine 15 in the exhaust gas conduit 21 due to the exhaust pulsations caused by the engine 15.

Because the expanding cooling water impinges upon the wide area of the inner wall of the water-lock 22, the cooling effect of the water-lock 22 can be enhanced. Additionally, because the direction of flow of the exhaust gases also expands, less turbulence is generated and the exhaust efficiency can be enhanced.

Because the distance d1 between the outer surface of the inner tube 28 and the inner surface of the exhaust gas conduit coupling section 22a, both of which together define the cooling water releasing port, can be shorter than the distance d2 between the downstream end of the exhaust gas conduit coupling section 22a and the distal end of the wide portion 28 of the inner tube 28, the wide portion 28a does not hinder the momentum of the cooling water spouting from the cooling water releasing port. Thus, the diffusion effect of the cooling water by the wide portion 28a of the inner tube 28 can be enhanced.

Because the diameter D1 of the distal end of the wide portion 28a of the inner tube 28 can be shorter than the inner diameter D2 of the exhaust gas conduit section 22a, the diffusion of the cooling water by the wide portion 28a of the inner tube 28 can expand more widely, and the cooling effect of the water-lock 22 can be further enhanced. Because the partitions 38, 39 are positioned in the inside area of the angle θ in which the distal end of the wide portion 28a of the inner tube 28 expands, and the upstream ends of the respective partition pipes 38, 39 has the wide portions 38a, 39a, the exhaust efficiency can be enhanced. Because the exhaust gas cooling system 20 can be structured as described above, the water vehicle 10 that can effectively prevent the cooling water from backwardly flowing toward the engine 15 even though the exhaust gas conduit 21 is short can be obtained.

The exhaust gas cooling systems according to the present inventions are not limited to the embodiments described above and can be properly modified or changed. For example, in some of the above embodiments, the wide portion 28a of the inner tube 28 has the bell mouth configuration that is shaped with the smoothly curved surface. The wide portion, however, is not limited to this configuration, and can have a funnel configuration. Additionally, the diameter of the wide portion can be widened step by step. The opening of the wide portion can have various shapes such as, for example, a circular shape, an elliptic shape, a rectangular shape, etc.

In some of the embodiments described above, as shown in FIGS. 2 through 4, the exhaust gas conduit coupling section 22a can be unitarily formed with the water-lock 22. The exhaust gas conduit coupling section 22a, however, can be formed separately from the water-lock 22. Then, the exhaust gas conduit coupling section 22a can be coupled with the water-lock 22 in typical manners such as, for example, using fastening members.

Further, in some of the embodiments described above, the exhaust gas cooling system 20 can be provided for a water vehicle such as the water vehicle 10. The exhaust gas cooling systems according to the present inventions can also be provided for other vehicles or the like, for example, vehicles that include a liquid-cooled exhaust gas passage. Also, structures, materials, etc. of other components which form the exhaust gas cooling system can be properly modified or changed within the technical scope of the present inventions.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An exhaust gas cooling system for an engine, comprising:
    an exhaust gas conduit having an inner tube defining an exhaust gas passage through which exhaust gases discharged from the engine pass, and an outer tube surrounding the inner tube and thereby defining a cooling water passage between the inner tube and outer tube, the cooling water passage being configured to pass cooling water that has cooled the engine; and
    a water-lock configured to prevent a backward flow of water, an exhaust gas conduit coupling section being formed at an upstream end portion thereof, the water-lock being coupled with a downstream end of the exhaust gas conduit through the exhaust gas conduit coupling section;
    wherein the exhaust gas conduit coupling section of the water-lock and the outer tube of the exhaust gas conduit are coupled with each other, the inner tube extending into an interior of the water-lock to form a cooling water releasing port between the exhaust gas conduit coupling section and the inner tube, the cooling water releasing port being configured to release the cooling water flowing through the cooling water passage such that the cooling water released from the cooling water releasing port and the exhaust gases discharged from the exhaust gas passage are mixed together within the water-lock, and wherein a downstream end part of the inner tube is formed such that the diameter of the inner tube becomes larger toward the downstream end so that the cooling water released into the water-lock diffuses.

2. The exhaust gas cooling system for an engine according to claim 1, wherein an outer diameter of the downstream end of the inner tube is smaller than an inner diameter of the exhaust gas conduit coupling section.

3. The exhaust gas cooling system for an engine according to claim 1, wherein the water-lock includes a partition dividing the interior of the water-lock into an upstream part and a downstream part, and a partition pipe piercing through the partition and allowing the exhaust gases and the cooling water to pass therethrough from the upstream part to the downstream part, the partition pipe being positioned inside of tangential lines crossing a central axis of the inner tube, the tangential lines contacting with an inner surface of the downstream end part of the inner tube.

4. The exhaust gas cooling system for an engine according to claim 1, in combination with a water vehicle.

5. The exhaust gas cooling system for an engine according to claim 1, wherein the downstream end part has a bell mouth configuration which gradually expands outwardly in such a manner that the downstream end part forms a smooth curved surface whereby the outer diameter becomes larger toward the downstream end.

6. The exhaust gas cooling system for an engine according to claim 5, wherein a distance between the exhaust gas conduit coupling section and the inner tube, which together form the cooling water releasing port, is shorter than a distance between the downstream end of the exhaust gas conduit coupling section and the downstream end of the inner tube.

7. The exhaust gas cooling system for an engine according to claim 5, wherein an outer diameter of the downstream end of the inner tube is smaller than an inner diameter of the exhaust gas conduit coupling section.

8. The exhaust gas cooling system for an engine according to claim 5, wherein the water-lock includes a partition dividing the interior of the water-lock into an upstream part and a downstream part, and a partition pipe piercing through the partition and allowing the exhaust gases and the cooling water to pass therethrough from the upstream part to the downstream part, the partition pipe being positioned inside of tangential lines crossing a central axis of the inner tube, the tangential lines contacting with an inner surface of the downstream end part of the inner tube.

9. The exhaust gas cooling system for an engine according to claim 1, wherein a distance between the exhaust gas conduit coupling section and the inner tube, which together form the cooling water releasing port, is shorter than a distance between the downstream end of the exhaust gas conduit coupling section and the downstream end of the inner tube.

10. The exhaust gas cooling system for an engine according to claim 9, wherein an outer diameter of the downstream end of the inner tube is smaller than an inner diameter of the exhaust gas conduit coupling section.

11. The exhaust gas cooling system for an engine according to claim 9, wherein the water-lock includes a partition dividing the interior of the water-lock into an upstream part and a downstream part, and a partition pipe piercing through the partition and allowing the exhaust gases and the cooling water to pass therethrough from the upstream part to the downstream part, the partition pipe being positioned inside of tangential lines crossing a central axis of the inner tube, the tangential lines contacting with an inner surface of the downstream end part of the inner tube.

12. An exhaust gas cooling system for an engine, comprising:
an exhaust gas conduit having a cooling jacket disposed on an outer surface of the exhaust gas conduit;
a water-lock, the exhaust gas conduit terminating at a downstream end within an interior of the water-lock, the cooling jacket terminating at a cooling water discharge disposed upstream of the downstream end of the exhaust gas conduit and configured to discharge water into the interior of the water-lock; and
wherein the downstream end of the exhaust gas conduit is enlarged so as to cause cooling water from the cooling water discharge to diffuse radially away from the downstream end of the exhaust gas conduit.

13. The exhaust gas cooling system for an engine according to claim 12, wherein the downstream end of the exhaust gas conduit comprises has a bell mouth configuration which gradually expands outwardly in such a manner that the downstream end part forms a smooth curved surface whereby an outer diameter of the exhaust gas conduit becomes larger along a direction toward the downstream end.

14. The exhaust gas cooling system for an engine according to claim 12, wherein a distance between an inner wall and an outer wall of the cooling water discharge is shorter than a distance from the cooling water discharge and the downstream end of the exhaust gas conduit.

15. The exhaust gas cooling system for an engine according to claim 12, wherein an outer diameter of the downstream end of the exhaust gas discharge conduit is smaller than an overall diameter of the cooling water discharge.

16. The exhaust gas cooling system for an engine according to claim 12, wherein the water-lock includes a partition dividing the interior of the water-lock into an upstream part and a downstream part, and a partition pipe piercing through the partition and allowing the exhaust gases and the cooling water to pass therethrough from the upstream part to the downstream part, the partition pipe being positioned inside of tangential lines crossing a central axis of the exhaust gas conduit, the tangential lines contacting with an inner surface of the downstream end part of the exhaust gas conduit.

17. The exhaust gas cooling system for an engine according to claim 12, in combination with a water vehicle.

18. An exhaust gas cooling system for an engine, comprising an exhaust gas conduit having an inner tube defining an exhaust gas passage through which exhaust gases discharged from the engine pass, and an outer tube surrounding the inner tube and thereby defining a cooling water passage between the inner tube and outer tube, a water-trap chamber, the inner tube extending into and terminating at a downstream end in an interior of the water-trap chamber, the cooling water passage terminating upstream from the downstream end of the inner tube so as to allow cooling water from the cooling water passage to be discharged into the water-trap chamber parallel to an outer surface of the inner tube, and means for causing the cooling water to disperse radially off of the outer surface of the downstream end of the inner tube and for causing exhaust gases to disperse radially outwardly from the exhaust gas passage at the downstream end of the inner tube.

\* \* \* \* \*